United States Patent [19]
DeGiorgio et al.

[11] 3,866,206
[45] Feb. 11, 1975

[54] EMERGENCY SIGNALLING SYSTEM HAVING MANUALLY OPERATED GENERATOR

[75] Inventors: John A. DeGiorgio, Burlington; Ahmed H. Labib; Subhash R. Rane, both of Stoneham, all of Mass.

[73] Assignee: Solid State Technology, Inc., Wilmington, Mass.

[22] Filed: July 17, 1973

[21] Appl. No.: 379,967

[52] U.S. Cl................... 340/298, 340/226, 325/185
[51] Int. Cl. ............................................. H04b 1/04
[58] Field of Search ............ 340/298, 226; 325/185, 325/186, 492, 6, 311

[56] References Cited

UNITED STATES PATENTS

| | | | |
|---|---|---|---|
| 2,978,676 | 4/1961 | Spencer | 340/226 X |
| 3,069,673 | 12/1962 | Ward | 340/226 X |
| 3,233,232 | 2/1966 | Brennon | 340/298 X |

*Primary Examiner*—Harold I. Pitts

[57] ABSTRACT

A remote electrical signalling system in which emergency call stations are manually operable to communicate with a home station, and a confirmation signal is automatically transmitted back from the home station when a call signal has been properly received. The call stations each include an electromechanical generator to power both a emergency signal transmitter section and a confirmation signal receiver section. Switch means are provided to direct a limited duration generator output first to the transmitter section and then to the receiver section. Power is recycled back to re-energize the transmitter section if a confirmation signal is not received within a pre-determined period of time.

At the home station emergency calls are received and the call station identified. A blocking circuit prevents the recording of an identifying digit or the transmission of a confirmation signal unless the previous digits of the call station identification have been recorded.

17 Claims, 12 Drawing Figures

PATENTED FEB 1 1 1975

3,866,206

SHEET 2 OF 8

EMERGENCY SIGNALLING SYSTEM HAVING MANUALLY OPERATED GENERATOR

BACKGROUND

This invention relates to signalling systems, and more particularly to a system with manually powered electrical call stations that are especially useful in emergencies and in remote locations, and with a home station that transmits a signal to confirm reception of a call signal.

1. Field of the Invention

There has long been a need for a simple, batteryless, wireless signalling system to make emergency calls possible from locations where electrical power is either not available or cannot be relied upon under the emergency conditions contemplated. This problem has become most acute with the emergence of the nationwide high speed, limited access highway system in which relatively large volumes of traffic are routed across long stretches of rural areas. The need for an emergency communication system also exists in newly developed residential areas remote from urban centers, where fire alarm boxes are presently provided with expensive underground wiring systems for protection from the elements.

2. Description of the Prior Art

In recent years at least on signalling system has been developed to satisfy the above need by the use of a number of manually operated call boxes distributed sturdy a protected area. The call boxes are strudy and easy to operate, being provided with a lever that is pulled down, in a manner similar to that used in operating a fire alarm box, to power a transmitter. One of several emergency services available may be selected as desired, and the receiver station is designed to discriminate among the various types of calls possible. This type of system has been found to be very useful in the furnishing of emergency aid, and call boxes employing the concept are now being distributed over portions of the nation's highway system.

Although the above system is quite reliable, there is of course no absolute guarantee of proper operation every time a call box is used. Various problems may arise to prevent the reception of an emergency call, such as an equipment failure at either the call box or the home station, or overpowering interference in the transmission medium. In such a case the caller has no way of knowing that his message has not been received, and may forego other emergency aid that might otherwise be available. It is also possible that a second attempt to operate a call box would have been successful, but the caller will have no immediate reason to try again.

The described call boxes are energized for only a few seconds when the lever is pulled, ruling out the use of auxiliary devices that require large amounts of power or long operating times. For greatest reliability it is essential that any remote call station be powered solely by mechanical force supplied by the user.

SUMMARY

In accordance with the above, it is an object of the present invention to provide a novel and improved emergency signalling system in which a confirmation signal is automatically transmitted by the home station upon reception of a call signal.

It is another object of the invention to provide a novel and improved signalling system in which call stations are provided with an electromechanical generator that powers both a call signal transmitter and a receiver means for reception of a signal confirming that the call signal was successfully received by a home station.

Another object of the invention is the provision of such a signalling system, in which power from the generator is sequentially directed first to the call signal transmitter and then to the confirmation signal receiver to efficiently utilize the generator power.

A further object is the provision of a novel and improved emergency signalling system that repeatedly transmits an emergency call if the first call is not successfully received.

Yet another object if the provision of a novel and improved signalling system having a home station with means for identifying a call signal, and in which a signal confirming reception of a call signal is transmitted only when the call signal has been fully decoded.

These and other objects of the invention are uniquely accomplished by a remote electrical signalling system that comprises one or more call stations, each station having an electromechanical generator and transmitter means connected to be energized by the generator, and a home station that includes receiver means for receiving a call signal. The call stations also include receiver means connected for energization by the generator, and manually operable means for operating the generator for a substantial period of time. Switch means are provided to direct an output from the call station generator to the transmitter means for an initial portion of the generator operating time, for transmission of a call signal, and to the receiver means for a subsequent portion of the generator operating time, for reception of a confirmation signal from the home station. The confirmation signal is transmitted from the home station by a transmitter means that is automatically operable in response to the reception of a call signal.

Each of the call stations is assigned a preset identifying signal, and also a number of selectable transmission modes corresponding to the type of service desired, the home station being provided with means for decoding a received signal to identify the call station and the selected service. The home station, however, preferably transmits only a single mode of confirmation signal, with timing means provided to terminate the confirmation signal transmission after a period of time sufficient to enable the confirmation signal receiver at the first call station to operate, and thereby prevent the confirmation signal from being sensed by subsequently operated call stations. Indicators at the call stations are actuated by the reception of a confirmation signal to indicate to the user that his call has been completed. Electrical storage means are preferably connected to the generator to energize the confirmation signal indicators for an additional period of time after termination of the generator operating time.

In a preferred embodiment the emergency call signal comprises a sequential series of pulses, shift register means being employed in the call station transmitter to sequentially direct a pulsed output from the generator to the circuitry defining each of the transmission modes. A control circuit recycles the call station to additional operating sequences should a confirmation signal not be received, by appropriate switching of the switch means.

According to another feature of the invention, the home station includes means for individually recording the digits of a multi-digit call signal, together with a circuit that blocks the supply of power to record a digit or energize the confirmation signal transmitter unless power has been supplied to record the previous digits of the call signal. When the call signal is in the form of a series of discrete pulses the blocking circuit included timing means to sequentially control the supply of power for recording the digits of the call signal, in a sequence corresponding to the sequential call signal transmission.

For the purpose of more fully explaining the above and still further objects and features of the invention, reference is now made to the following detailed description of a particular embodiment of the invention, together with the accompanying drawings.

DETAILED DESCRIPTION OF A PARTICULAR EMBODIMENT

Figure 1:
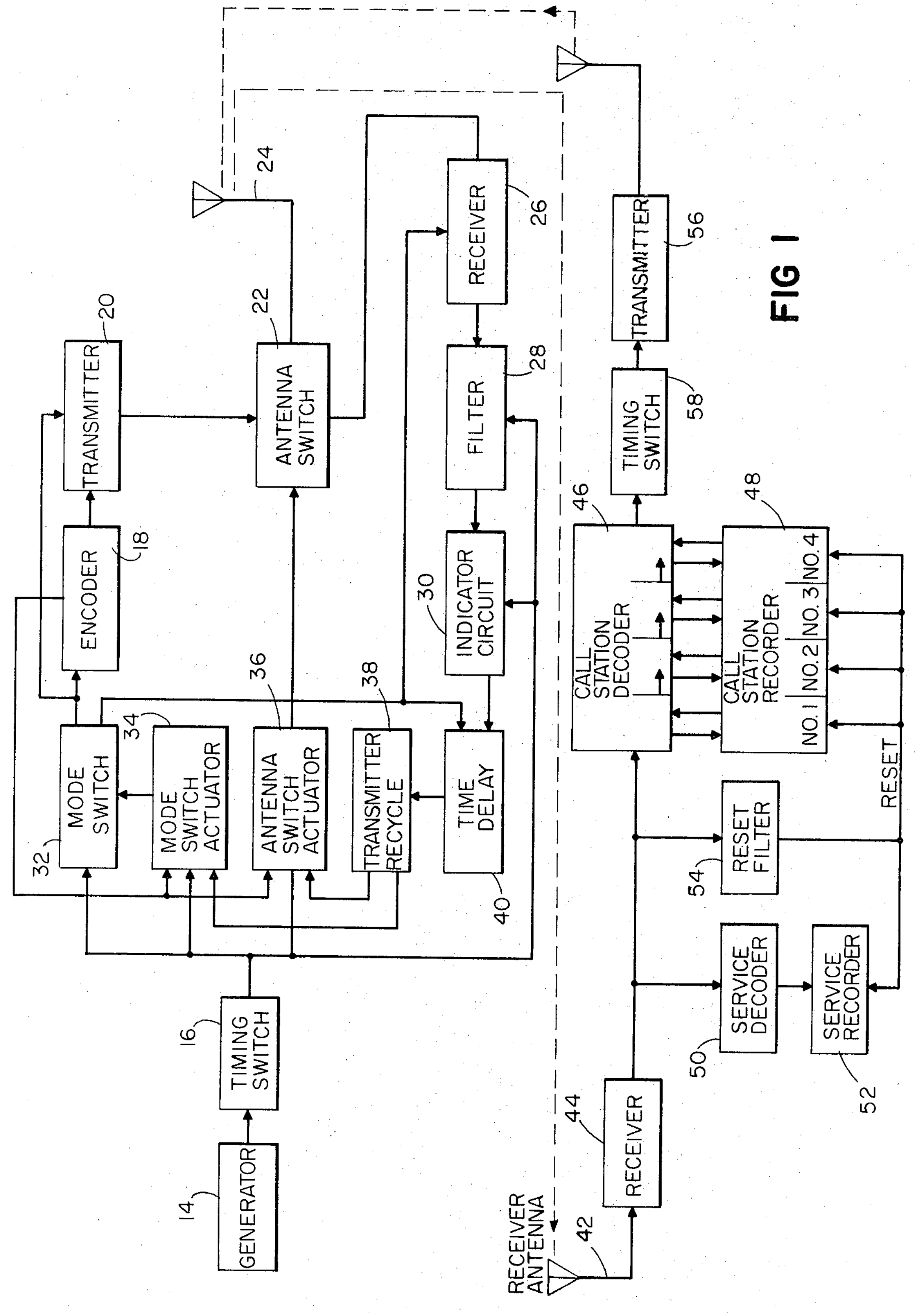
FIG. 1 is a block diagram of a signalling system constructed according to the invention.

Referring to the drawings, and especially to FIG. 1 thereof, the remote signalling system of the invention includes one or more emergency call stations generally designated by numeral 10, and a home station 12. At the call station 10 a manually operated electromechanical generator 14 is connected through one terminal of a timing switch 16 for controlled energization of a transmitter section that comprises an encoder circuit 18 adapted to produce a pre-set call station identification signal and a selectable signal indicating the type of service desired, and a transmitter device 20, the output of which is fed through an antenna switch 22 to a transceiver antenna 24. While other means of communication could be used, radio apparatus is most suitable for the type of remote signalling required, and the remainder of this specification will be directed to this communications means.

The generator 14 also energizes a receiver section which comprises a radio receiver 26 that is connected to antenna 24 through another terminal in switch 22, a filter 28 set to the frequency of a confirmation signal broadcast by the home station 12, and an indicator circuit 30 that causes a tone to be sounded when a confirmation signal is received. Apparatus for switching the call station between transmitting and receiving modes includes a mode switch 32 connected to switch the generator output, an actuator 34 for the mode switch, an actuator 36 for the antenna switch 22, a circuit 38 for recycling the call station to additional transmitting and receiving sequences should a confirmation signal not be received during the first such sequence, and a time delay circuit 40 that is energized with the receiver section and actuates the recycle circuit 38 if not overriden by the reception of a confirmation signal. In the operation of the call station, an output from generator 14 is first directed to the transmitter section for transmission of a coded emergency signal. After one round of signal, the generator output is directed to the receiver section for reception of a confirmation signal, while the antenna switch 22 switches the antenna 24 from the transmitter to the receiver section.

At the home station 12 call signals are picked up by a receiver antenna 42, which is connected to a conventional radio receiver 44. A decoder circuit 46 identifies the call station and controls a recording device 48, such as a visual display panel, to record the digits comprising the call station identification symbol. As will be more fully described hereinafter, the call station decoder 46 is adapted to reduce recording errors by preventing the recording of a digit unless power has been supplied to record the previous digits in the identification symbol. The type of service called for is identified by another decoder circuit 50 that controls an appropriate service recording device 52. A filter circuit 54 isolates a reset signal constituting the initial portion of the call signal and applies an output signal to reset the call station and service recording apparatus. A confirmation signal transmitter 56 is energized when the call station identification symbol is completely recorded, a timing switch 58 being provided to terminate the transmission after a period sufficient for the call station receiver section to act, which is generally about two seconds.

Figure 3:
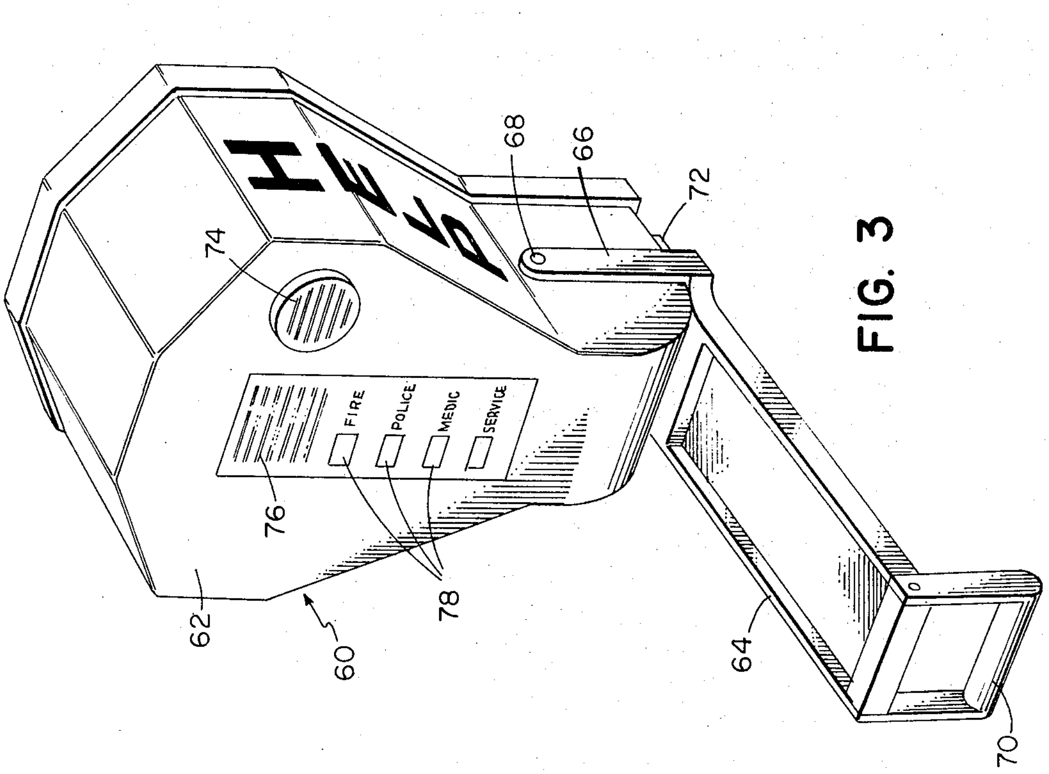
FIG. 3 is a perspective view of a call station with its operating lever pulled down.
Figure 2:
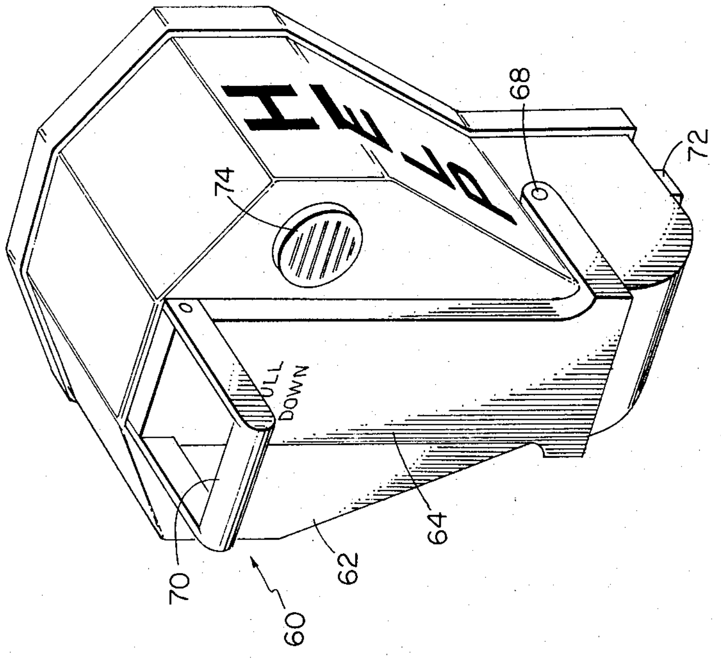
FIG. 2 is a perspective view of a call station with its operating lever in a normal position.

Exterior features of the call station are shown in FIGS. 2 and 3, the mechanical apparatus being like that disclosed in U.S. Pat. No. 3,621,398 issued to the assignee of the present applicant, the disclosure of which patent is hereby incorporated by reference. The station includes a weatherproof enclosure 60 having a vertical front wall 62 and an operating lever 64 normally overlying front wall 62 of the enclosure 60 and having at its lower end two arms 66 extending perpendicularly inward and mounted on pivot shaft 68. A prominent handle 70 projects perpendicularly outward from the upper free end of lever 64 for use in an emergency by pulling it down, much in the same manner as a conventional fire alarm box, stop 72 limiting the downward movement of lever 64 to an arcuate path of about 90°. An audio tone device 74 is actuated to indicate the reception of a confirmation signal.

In FIG. 3 lever 64 is shown in its lowered position exposing instruction plate 76 and a plurality of pushbuttons 78 mounted on front wall 62, each button bearing indicia of a separate emergency service, such as Fire, Police, Medical, Service. Lowering the lever 64 operates electromechanical generator 14 to broadcast an emergency call signal when one of the pushbuttons 78 is depressed, as described in the above-mentioned U.S. Pat. No. 3,621,398.

Figure 4:
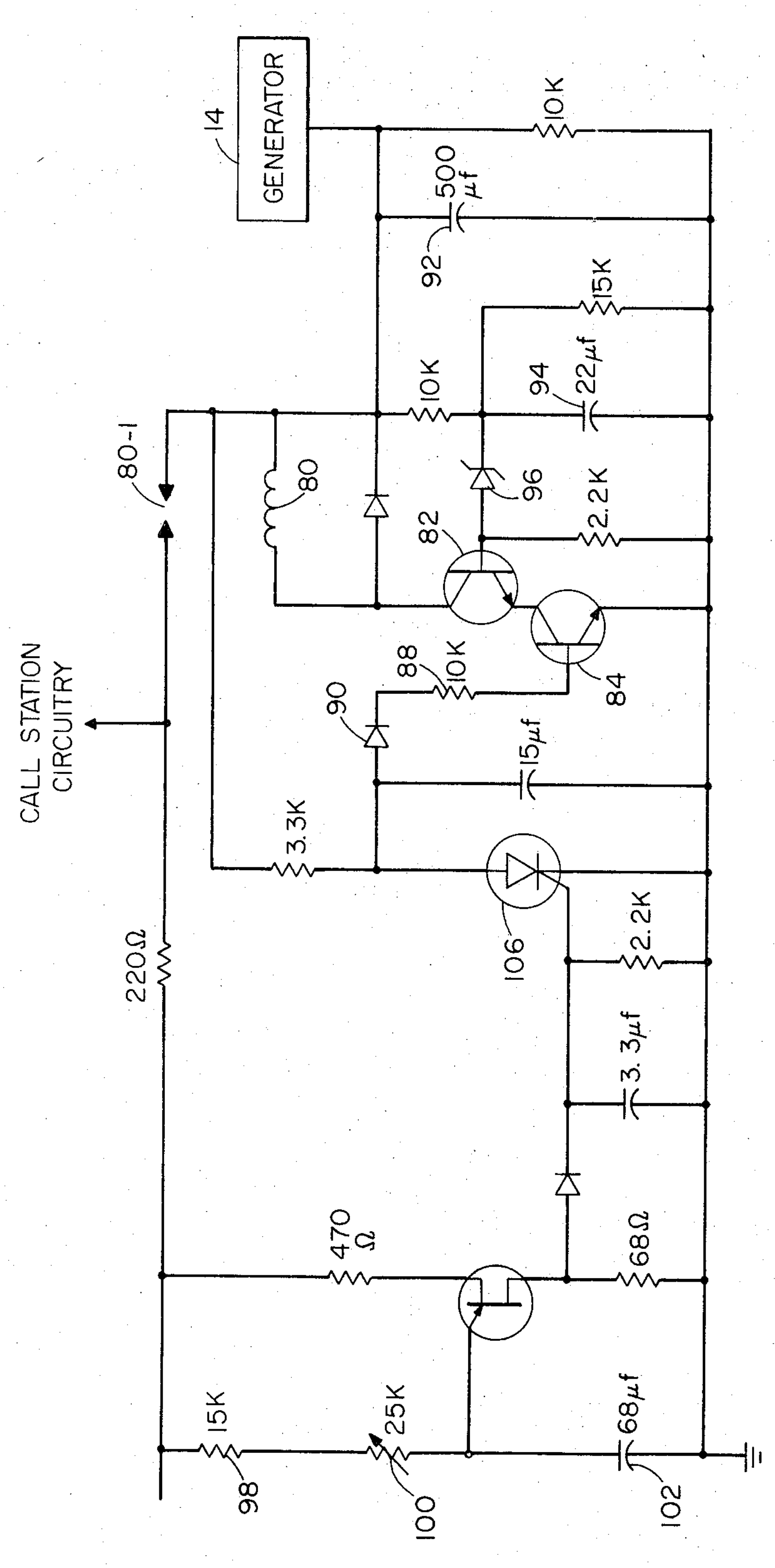
FIG. 4 is a schematic diagram of a timing circuit for a call station.

Details of the circuit for timing switch 16, which delays the application of the generator voltage to the remainder of the call station for a short initial period to provide sufficient time for full voltage to develop, and then disconnects the generator after about 2.5 or 3.0 seconds, are shown in FIG. 4. This time period permits the call station to go through three transmission/reception sequences before turning off. A relay coil 80 controls normally open contacts 80-1, which separate the generator 14 from the remainder of the call station circuitry. A circuit to complete an energization path for the relay coil 80 is provided through the series connected emitter-collector circuits of transistors 82 and 84, the latter transistor being connected to the generator 14 through resistors 86 and 88 and diode 90 for substantially immediate conduction when the generator is operated. A first capacitor 92 initially shunts the generator output to delay the voltage buildup across relay coil 80, an additional delay being provided by a second capacitor 94 connected on one side through a zener diode 96 to the base of transistor 82, and on the other side to ground. The relay coil 80 is energized when the voltage across capacitor 94 reaches a level sufficient to place the zener diode 96 in reverse conduction and thereby gate the transistor 82.

The length of the period during which the generator output is applied to the call station circuitry is determined by a circuit consisting of a fixed resistor 98, a variable resistor 100, and a capacitor 102, connected for energization when relay contacts 80-1 close. The emitter of a unijunction transistor 104 is connected to the circuit to place the unijunction in conduction when the call station has operated for the said time period. A silicon controlled rectifier (SCR) 106, the anode-cathode circuit of which is connected between ground and the junction of resistor 86 and diode 90, has a gate connected to the unijunction 104 for firing the SCR when the unijunction turns on, thereby shorting the base circuit of transistor 84 sufficiently to bring that transistor out of conduction and open the energizing path for relay coil 80.

Figure 5:
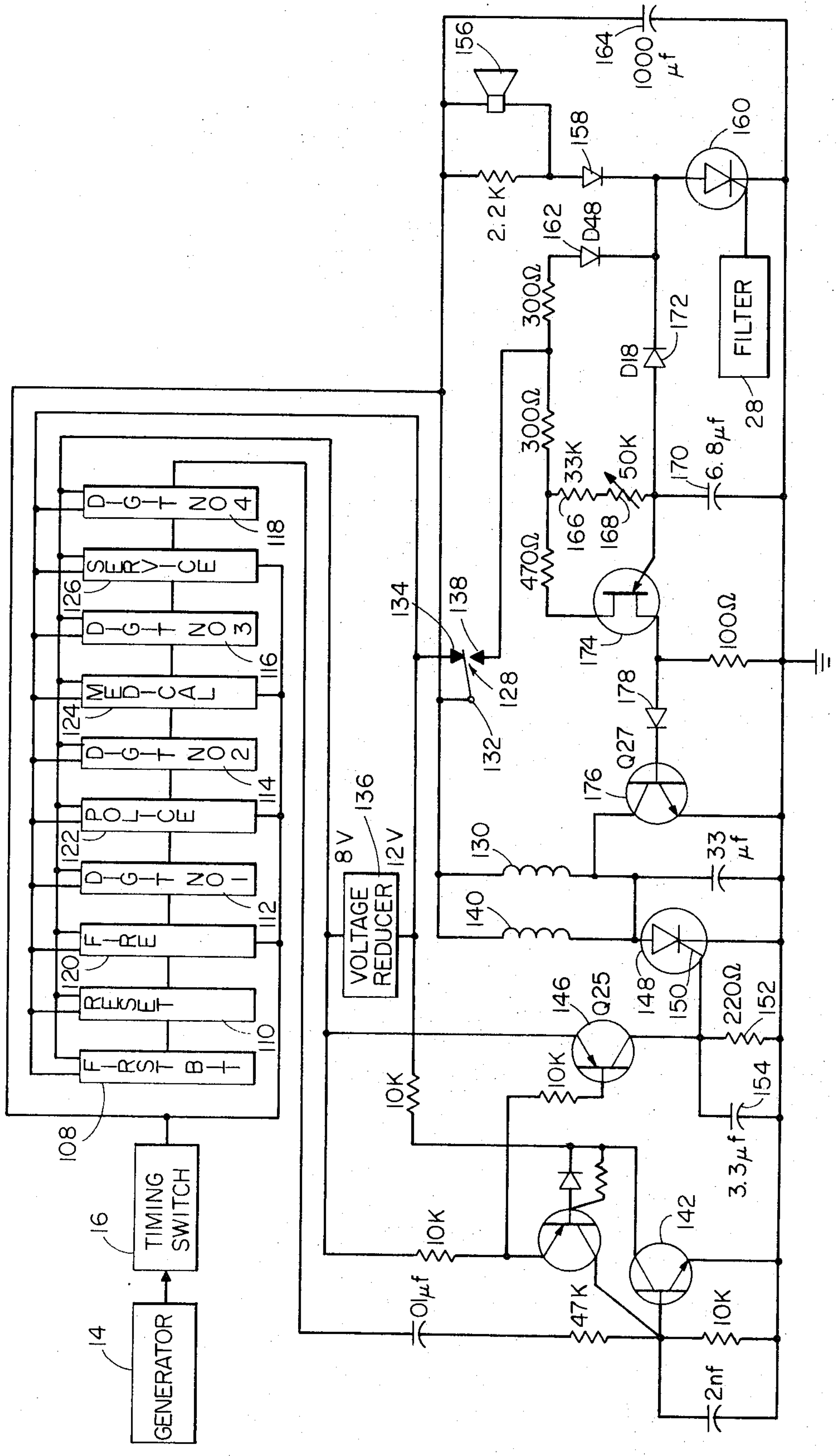
FIG. 5 is a schematic diagram of the call station circuitry, with transmission features shown in block diagram form.

Referring now to FIG. 5 for a more detailed description of the call station circuitry, the transmitter section shown in block diagram form employs a shift register mechanism as the controlling element, the various bits in the register each serving to actuate the transmission of a particular portion of the emergency call signal. Following a first shift register bit 108, a plurality of preset bits 110, 112, 114, 116, and 118 are respectively adapted to actuate the transmission of a reset signal and of four alphanumeric digit signals that identify the call station, the first digit bit corresponding to the digit in the "1,000" position of the call station identification number, etc. The said bits are arranged in the shift register alternately with a plurality of selectable bits 120, 122, 124, and 126 which actuate the transmission of a signal identifying the service desired. Each digit bit 112–118 controls an oscillator that is set within an assigned frequency channel, the particular frequency setting within each channel identifying the digit for that position in the call station identification number. In operation, the shift register bits are energized in sequence to produce a series of transmission pulses, each pulse lasting for about 40 milliseconds. A further description of the shift register circuitry is given in conjunction with FIGS. 6 and 7.

Switching of the call station between transmission and reception modes is accomplished by a switch 128 controlled by relay coil 130. The common switch terminal 132 is connected to the generator 14 through timing switch 16. A circuit is completed through one switch contact 134 for energizing the transmitter section at the generator voltage and at a lower voltage provided by a voltage reducing device 136, and for supplying bias voltage to the relay actuating circuitry when the relay coil 130 is de-energized. The other, normally de-energized, switch contact 138 is connected to the receiver section, the time delay circuit 40, and the recycle circuit 38. A second relay coil 140 is connected in parallel with coil 130 and controls antenna switch 22. Circuitry for energizing the relay coils 130 and 140 includes transistor 142, the base of which is connected to the last bit 118 in the shift register to drive the transistor 142 into conduction when an output appears from bit 118, transistor 144 having its base connected to the collector-emitter circuit of transistor 142, transistor 146 with its base connected to the collector-emitter circuit of transistor 144, and SCR 148 connected in series with the parallel combination of relay coils 130 and 140. The SCR gate 150 is connected to an RC circuit consisting of resistor 152 and capacitor 154, the other side of the RC circuit being connected to ground, and to the ground side of the collector-emitter circuit of transistor 146. A pulse produced when the last shift register bit operates causes transistors 142, 144, and 146 to conduct, gating SCR 148 after a time delay provided by the RC circuit to complete an energization path for relay coils 130 and 140 and thereby switch the call station from a transmitting to a receiving mode.

In the indicator circuit 30 an audio beeper device 156 is connected on one side to the generator 14, and on the other side through a diode 158 to the anode-cathode circuit of an SCR 160 that is connected to the filter 28 for gating when a confirmation signal is received. The SCR 160 is held in initially via switch contacts 138 and diode 162, until beeper 156 is energized. A capacitor 164 parallels the indicator circuit to extend the beeper signal beyond the generator operating time. Time delay circuit 40 includes, in series circuit, resistor 166, variable resistor 168, and capacitor 170. The juncture of the last two elements is connected to the anode of SCR 160 through diode 172, and to the emitter of a unijunction transistor 174 in the recycle circuit 38. Also in the recycle circuit, shunting the relay coils 130 and 140, is transistor 176, fired by the conductive output of unijunction 174 through diode 178.

A confirmation signal received by the filter 28 gates SCR 160, causing the beeper 156 to sound and shorting capactor 170 to prevent it from charging. If no confirmation signal is received within a certain period of time after energization of relay coil 130, as determined by the values of delay circuit elements 166, 168, and 170, capacitor 170 will become charged to a level sufficient to fire unijunction 174, gating transistor 176 to conduct and short circuit the relay coils 130 and 140. The relays will thereby de-energize, switching the call station back to a transmission mode for another call sequence.

Figure 6:
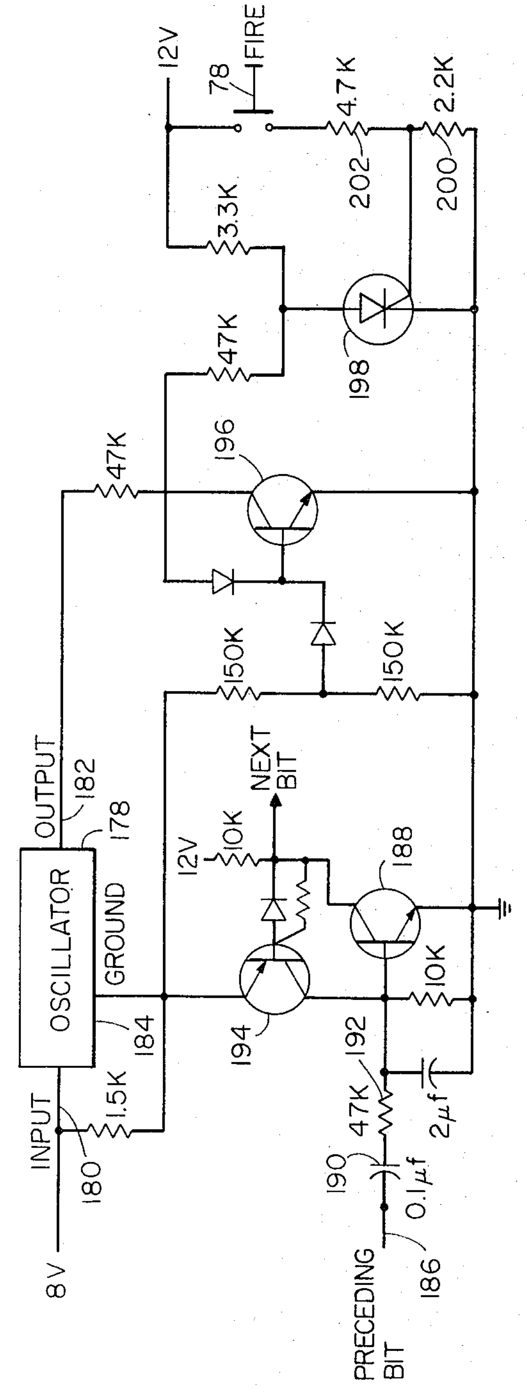
FIG. 6 is a schematic diagram of a service selection circuit in a call station.
Figure 7:
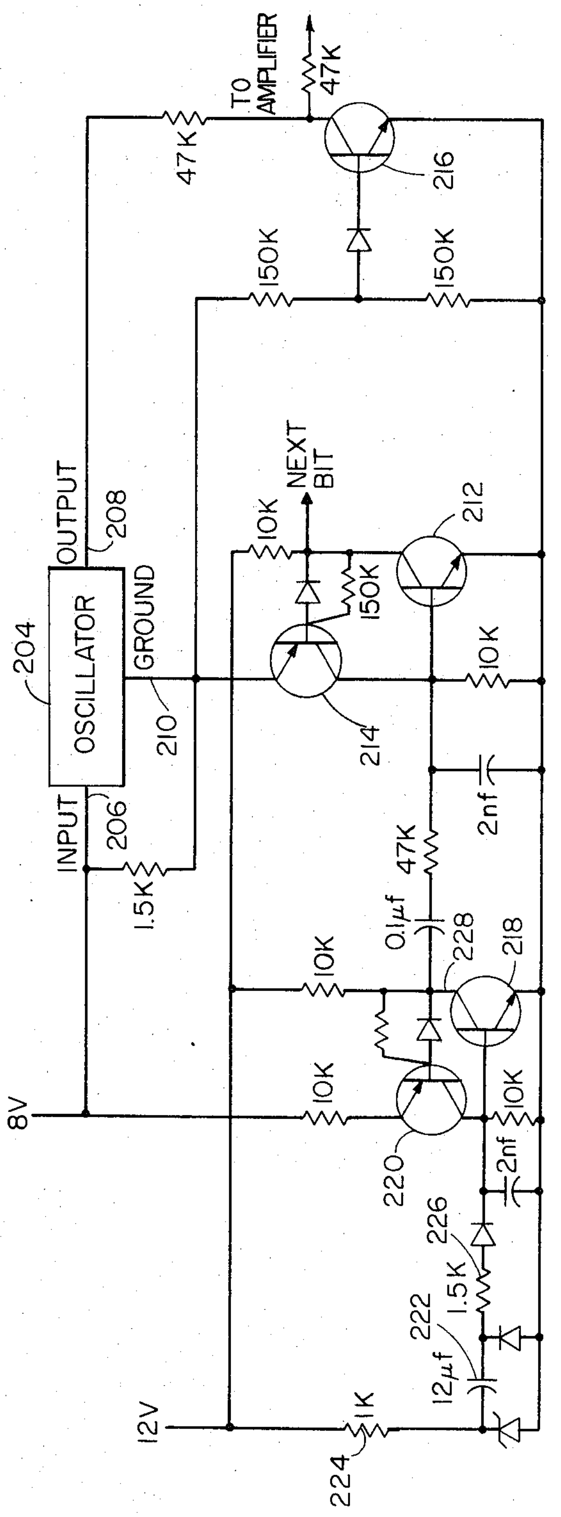
FIG. 7 is a schematic diagram of pre-set shift register bits in the call station transmitter section.

The circuitry of a shift register bit adapted for selectable transmission of a service signal is shown in FIG. 6. An oscillator 178, set to a particular frequency for the service, has an input terminal 180 connected to the generator voltage as reduced by voltage reducer 136, an output terminal 182 connected to energize transmitter 20, and a ground terminal 184. An operation of the preceding bit causes a pulse signal to appear at lead 186, which is connected to the base of a switching transistor 188 through capacitor 190 and resistor 192. Transistor 194, switched on by transistor 188 conducting, is in circuit with the oscillator ground terminal 184. The emitter of transistor 194 communicates with the base of transistor 196, connected in circuit with the oscillator output terminal 182, to gate transistor 196 into a conduction state opposite that of transistor 194.

The above-described shift register bit circuitry is repeated for each of the service selection and digit bits. In addition, the service selection bits have a circuit that includes a service pushbutton 78, and an SCR 198 shunting the base circuit of transistor 196. The gate of SCR 198 is connected between voltage dividing resistors 200 and 202 for triggering when the voltage divider circuit is energized by pushbutton 78 being depressed. With the SCR 198 non-conducting, oscillator output terminal 182 is grounded through transistor 196 sufficiently to prevent the transmission of a signal from the oscillator 178. When the service selector pushbutton 78 is depressed, SCR 198 is triggered into conduction, lowering the voltage level at the base of transistor 196 sufficiently to remove that transistor from conduction and enable a transmission from oscillator 178 when a signal is introduced at terminal 186 from the preceding bit.

Figure 8:
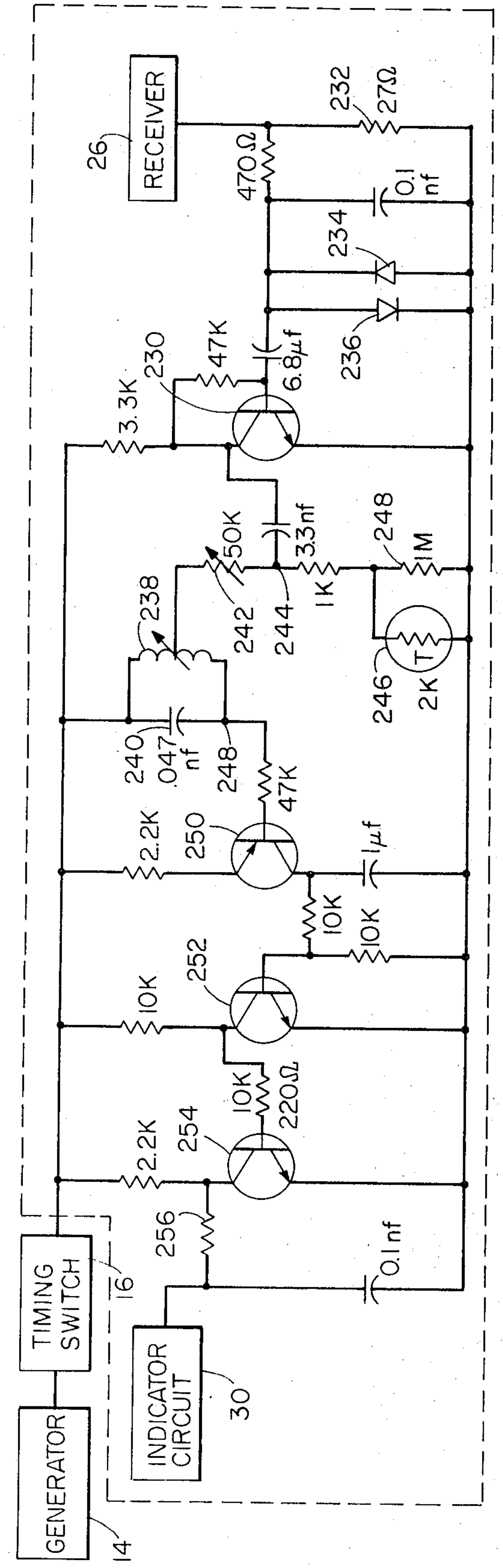
FIG. 8 is a schematic diagram showing the call station receiver section.

The circuitry for the first bit 108 and the reset bit 110 is shown in FIG. 8, each of the digit bits 112, 114, 116, and 118 being constructed identically with reset bit 110 except for the oscillator frequency. The reset bit has an oscillator 204 with an input terminal 206, output terminal 208, and ground terminal 210. Transistors 212, 214, and 216 are respectively connected with the oscillator 204 in the same circuit arrangement as that of transistors 188, 194, and 196 with oscillator 178. A transmission being desired from each of the reset and digit circuits each time the call station transmits, no manual selection feature is provided. Sequential pulsing through the shift register bits is initiated by the first bit 108, which includes transistor 218 biased off the high voltage supply line, transistor 220 biased by the reduced voltage supply line and gated into conduction by transistor 218 conducting, and a circuit comprising capacitor 222 and resistors 224 and 226 between the high voltage supply line and the base of transistor 218. A signal at the collector 228 of transistor 218 initiates a sequential actuation of the remaining bits.

In the call station receiver section, shown in FIG. 8, an amplifying transistor 230 amplifies a confirmation signal from receiver 26. Output impedance matching resistor 232 is connected to the receiver output, and diodes 234 and 236 limit the voltage at the amplifier. A filter circuit formed by a variable inductance coil 238 and capacitor 240 is tuned to the frequency of the confirmation signal, potentiometer 242 being provided between the filter circuit and amplifier output lead 244 to set the filter circuit bandwidth at 30 Hz. Thermistor 246, connected across resistor 248, stabilizes circuit characteristics under wide temperature range. The filter circuit output terminal 248 is connected to inverter transistors 250, 252, and 254, the collector-emitter circuit of transistor 254 being connected through resistor 256 to the gate of SCR 160 in the indicator circuit. The voltage level at the base of transistor 250 drops when the tuned circuit resonates in response to a confirmation signal, gating SCR 160 to actuate beeper 156.

Figure 10:
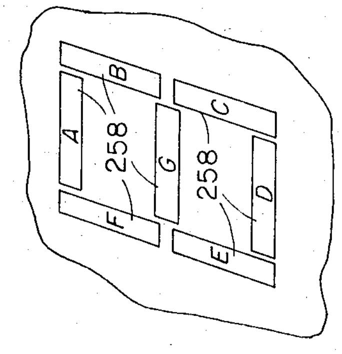
FIG. 10 is an illustration of a digit display arrangement.
Figure 9A:
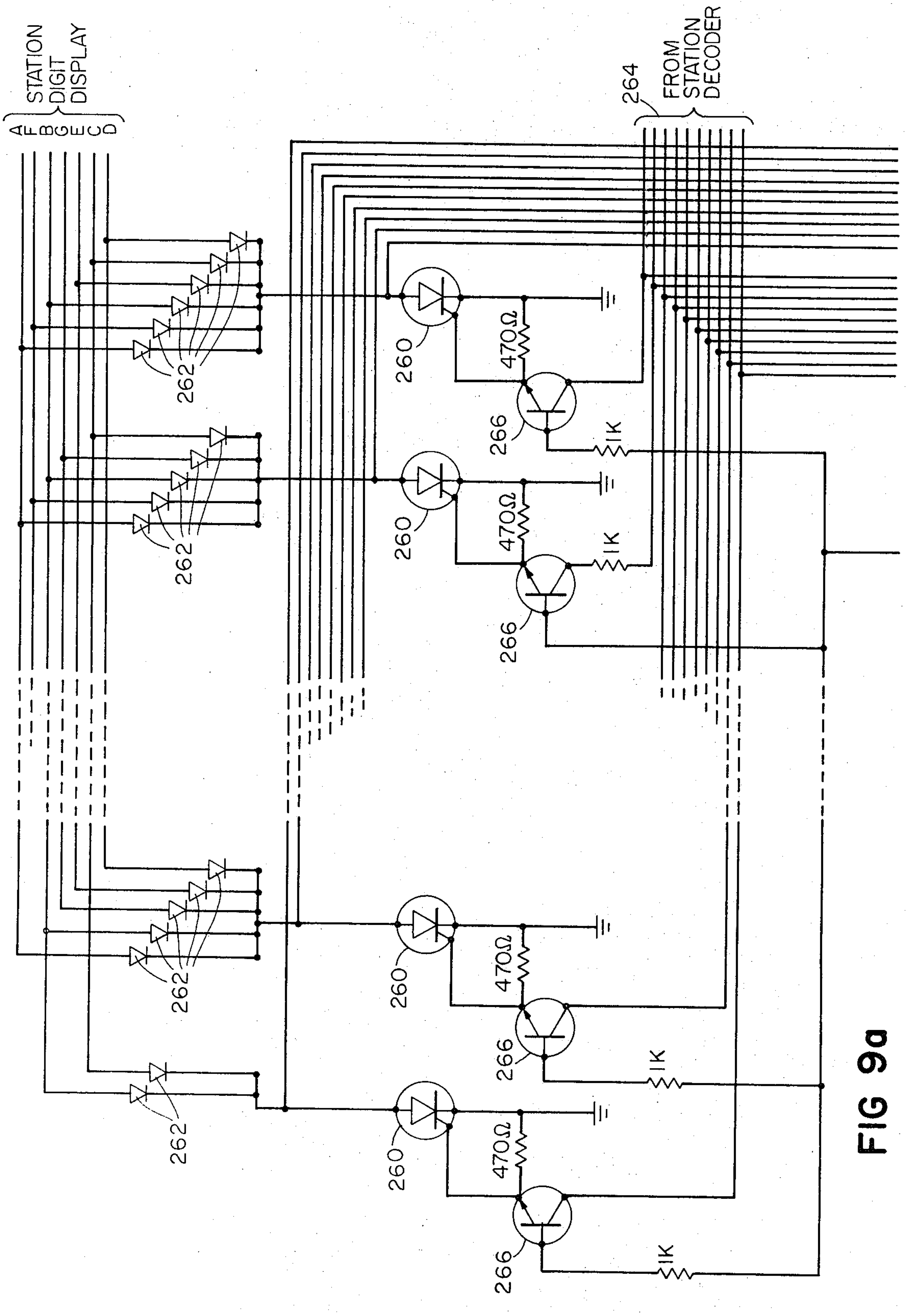
FIGS. 9*a* and 9*b* are schematic diagrams of portions of the home station decoder and display circuitry.
Figure 9B:
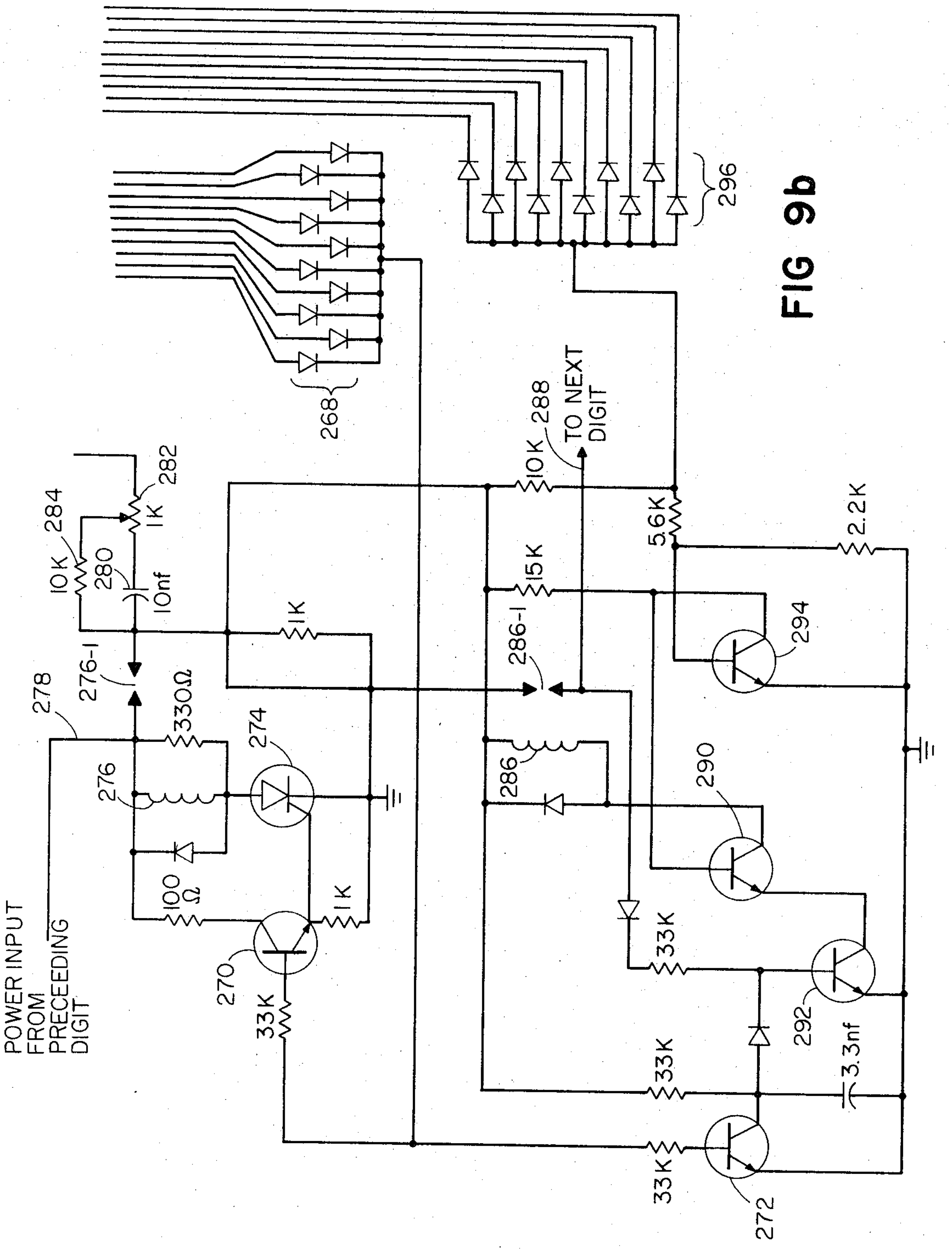

At the home station a call station is identified by individual recorder units, designated Nos. 1–4 in FIG. 1, and corresponding decoder units, a separate decoder-recorder pair being provided for each digit in the call station identity signal. The circuitry for each digit is repetitive, and can be described by referring to a single recorder unit, shown in FIGS. 9*a* and 9*b*. The recorder unit includes a display board, shown in FIG. 10, of a well-known type in which seven lamps 258 are arranged such that any digit from zero to nine can be displayed by lighting an appropriate pattern of lamps. The display is controlled by 10 SCR's 260 (four of which are shown in FIG. 9*a*), one for each possible digit. Each SCR 260 is connected in series circuit with its associated lamps through diodes 262, and completes a lamp energizing path when in a conducting mode.

The station decoder unit includes ten filters, one for each possible digit, each filter being connected by one of leads 264 to the collector of a transistor 266 for gating one of the 10 SCR's 260. The filter leads 264 are also connected through diodes 268 to the bases of switching transistors 270 and 272. An SCR 274 is gated when transistor 270 conducts to complete an energizing path for a relay coil 276. Power for the circuit is supplied over lead 278 from the circuit for the recorder unit for the preceding digit position or, in the case of the first recorder unit, directly from a power supply at the home station. Normally open relay contacts 276-1 couple power lead 278 through a circuit, consisting of capacitor 280 and potentiometer 282 in parallel with resistor 284, to the bases of transistors 266. A signal from any of the filters in the station decoder switches transistor 270 into conduction, gating SCR 274 to complete an energizing path for relay coil 276. The contacts 276-1 close if power is present at lead 278, thereby gating each of the transistors 266. A signal is transmitted through one of transistors 266 from the filter that is tuned to the call station frequency, gating the SCR 260 to complete a circuit for the appropriate lamp display.

Power is supplied to the next recorder unit only if the display has been energized. This is accomplished by means of a circuit that includes a relay coil 286, normally open contacts 286-1 between the normally unpowered terminal of contacts 276-1 and a power lead 288 for the next recorder unit, transistors 290 and 292 having their collector-emitter circuits connected in series in an energizing path for coil 286, and transistor 294. A bank of diodes 296 hold the voltage at the base of transistor 294 to no more than the minimum voltage at the anode of any of SCR's 260, while the collector of transistor 294 is tied to the base of transistor 290. In operation, one of SCR's 260 is triggered when power is supplied to the recording unit by lead 278 and one of the decoder filters responds to an emergency call signal, energizing the appropriate lamps. The base of transistor 294 is also grounded, bringing that transistor out of conduction to provide a gating signal for transistor 290. The gating signal is removed from transistor 272 and it stops conducting when the 40 msec. emergency call signal terminates, elevating the voltage at the base of transistor 292 to trigger that transistor and thereby complete an energizing path for relay coil 280. Relay contacts 280-1 accordingly close to transmit the supply power to the recorder unit for the next digit position.

Should the proper SCR 260 fail to establish and maintain an energizing path for the display board, transistor 294 remains in conduction, grounding the base of transistor 290 to open the energizing path for relay coil 286 and thereby block the supply of power to the next recorder unit.

Figure 11:
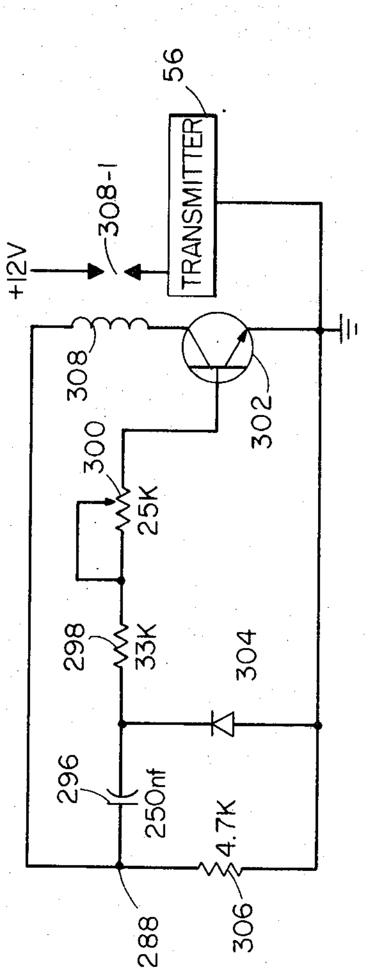
FIG. 11 is a diagram of a timing switch for the home station.

The circuit for the home station timing switch 58, shown in FIG. 11, includes a capacitor 296, resistor 298, and variable resistor 300, all connected in series to the base of a transistor 302, and a diode 304 and resistor 306 which provide a leakage path for capacitor 296. The power output lead 288 for the last call station recorder unit is connected to the side of capacitor 296 opposite the remainder of the timing switch circuitry, and also to one terminal of relay coil 308, the other terminal of which is in the collector-emitter circuit of transistor 302. Normally open relay contacts 308-1 connect transmitter 56 with a power supply when the relay coil 308 is energized. An output power signal from the last call station recorder unit on lead 288 gates transistor 302 to complete an energizing path for relay coil 308, permitting transmitter 56 to transmit a confirmation signal. The values of capacitor 296 and resistors 298 and 300 are selected such that the voltage at the base of transistor 302 is reduced to below the gating level after about two seconds, at which time transistor 302 ceases to conduct, relay coil 308 deenergizes, contacts 308-1 open, and the transmitter 56 stops transmitting.

The operating sequence of the signalling system can now be summarized. The motorist or other person seeking aid pulls the call box operating lever 64 and pushes a service selection button 78 to initiate an emergency call. After a slight delay provided by timing switch 16, generator 14 reaches full voltage. At this time relay coils 130 and 140 are deenergized, directing the generator output to the transmitter section and connecting the antenna 24 to the transmitter 20. The transmitter 20 broadcasts a sequence of pulse signals beginning with a reset signal for the home station recorders, and following with four pre-set signals corresponding to the identifying digits of the call station and a signal for the service selected.

The emergency call is received at the home station where, following a resetting operation, the service signal is processed by decoder 50 to actuate service recorder 52. The first station identity signal pulse is detected by the appropriate filter in the first unit of the call station decoder 46, which actuates the first unit of the call station recorder 48 to display the first digit in the call station identification number. Power is then supplied to the second recorder unit concurrently with the arrival of the second identity signal pulse at the second decoder unit. This and the subsequent identity signals are displayed in turn, actuating the confirmation signal transmitter 56 for about two seconds before termination by the timing switch 58.

Back at the call station, capacitor 152 will have acquired a sufficient charge by this time to trigger SCR 148, energizing relay coils 130 and 140 to place the call station in a receiving mode with antenna 24 connected to receiver 26 and the generator output directed to the filter 28 and indicator circuit 30. The confirmation signal is picked up and causes beeper 156 to operate, thereby informing the caller that his call has been properly received and recorded at the home station.

Should the energization circuit for the display of any digit fail to be completed in the call station recorder 48, the supply of power to all the subsequent call station recorder units and to the confirmation signal transmitter 56 is blocked. A confirmation signal not being received at the call station after it has switched to a reception mode, capacitor 170 charges sufficiently to gate unijunction transistor 174. Transistor 176 thereby begins to conduct, short circuiting the SCR 148 thus removing the hold-in voltage across it. The call station switches back to a transmission mode when the relay coils de-energize and goes through another transmission-reception sequence similar to the foregoing. If there is still no confirmation signal, a third sequence is performed, after which capacitor 102 in the circuitry for timing switch 16 will have charged sufficiently to cause the switch to open, disconnecting the generator 14 from the remainder of the call station and concluding the system operation. Having received no confirmation indication, the caller will be aware that his call has not been completed and can act accordingly.

While a particular embodiment of the invention has been shown and described, there are modifications thereof which will be apparent to those skilled in the art, and therefore it is not intended that the invention be limited to the disclosed embodiment or the details thereof, and departures may be made therefrom within the spirit and scope of the invention as defined in the claims.

What is claimed is:

1. A remote electrical signalling system comprising:

one or more call stations each including an electromechanical generator, transmitter means connected to be energized by said generator, receiver means connected to be energized by said generator, manually operable means for operating said generator for a substantial period of time, and switch means connected to direct an output from said generator to said transmitter means for an initial portion of the generator operating time for transmission of a call signal, and to said receiver means for a subsequent portion of the generator operating time for reception of a confirmation signal, and a home station including receiver means for reception of a call signal, and transmitter means automatically operable in response to the reception of a call signal for transmission of a confirmation signal.

2. A signalling system as claimed in claim 1 having a plurality of call stations, wherein each call station is adapted to transmit an identifying call signal, and means are connected to said home station receiver means to decode a received call signal and thereby identify the call station.

3. A signalling system as claimed in claim 2, wherein the identifying call signal for each call station corresponds to a multi-digit alphanumeric symbol, further including means connectable to a power supply at said home station for individually recording the digits of said symbol, and a circuit blocking the supply of power to record a digit unless power has been supplied to record the previous digit of the identifying symbol, said blocking circuit further adapted to block the supply of power for energization of the confirmation signal transmitter unless power has been supplied to record all the digits of the identifying symbol.

4. A signalling system as claimed in claim 3, wherein each call station includes means for sequentially transmitting a series of discrete signals corresponding to the digits of its identifying symbol.

5. A signalling system as claimed in claim 4, wherein said home station power supply blocking circuit includes timing means for sequentially controlling the supply of power to record the digits of the call station identifying signal, in a sequence corresponding to the sequential transmission of said signal.

6. A signalling system as claimed in claim 2, wherein the receiver means associated with all of the call stations are adapted to receive the same confirmation signal.

7. A signalling system as claimed in claim 1, including means at said call stations controlling the operation of said switch means, said control means adapted to recycle the call station to additional operating sequences after the first operating sequence, each said sequence comprising an initial period during which the generator output is connected by said switch means to the transmitter means, a subsequent period during which the generator output is connected to the receiver means of the call station, and further including means responsive to the reception of a confirmation signal at the call station for overriding said control means and terminating operation of the call station transmitter means.

8. A signalling system as claimed in claim 1, and further including timing means at said home station actuated in response to the reception of a call signal, said timing means adapted to terminate transmission of a confirmation signal after a period of time sufficient to enable said call station confirmation signal receiver to operate.

9. A signalling system as claimed in claim 1, and further including an indicator connected to said call station receiver means, said indicator actuated by the reception at the call station of a confirmation signal.

10. A signalling system as claimed in claim 1, wherein said electromechanical generator operating time is in the range of about 2.5 to 3 seconds.

11. A call station for use in a remote electrical signalling system comprising

- an electromechanical generator,
- manually operable means for operating said generator for a substantial period of time,
- transmitter means connected to be energized by said generator,
- receiver means connected to be energized by said generator, and
- switch means connected to direct an output from said generator to said transmitter means for an initial portion of the generator operating time for transmission of a first signal, and to said receiver means for a subsequent portion of the generator operating time for reception of a second signal.

12. A call station as claimed in claim 11, including means controlling the operation of said switch means, said control means adapted to recycle the call station to additional operating sequences after the first operating sequence, each said sequence comprising an initial period during which the generator output is connected by said switch means to the transmitter means, and a subsequent period during which the generator output is connected to the receiver means, and further including means responsive to the reception of said second signal for overriding said control means and terminating operation of the transmitter means.

13. A call station as claimed in claim 11, wherein said transmitter means includes circuitry defining a plurality of selectable transmission modes, each mode corresponding to an item of intelligence to be transmitted, manually operable means for selecting one of said transmission modes, and circuitry defining a preset transmission mode corresponding to the digits of a multi-digit identifying symbol for the call station, and wherein said receiver means is preset to a single reception mode.

14. A call station as claimed in claim 13, wherein said transmitter means includes shift register means adapted to apply an output from the generator to the circuitry defining each of said transmission modes in a sequence of pulses, whereby said first signal transmitted by the transmitter means comprises a sequential series of pulses.

15. A call station as claimed in claim 11, further including indicating means connected to said receiver means to indicate the reception of said second signal, and electrical storage means connected to said generator for energizing said indicator after the termination of the generator operating time.

16. A receiver station for use in a remote electrical signalling system comprising:

- radio receiver means for reception of a plurality of coded signals,
- multi-unit recording means,
- decoder means individually controlling the energization of each unit in said recording means in response to receipt of a coded signal, said decoder means adapted to enable energization of each recording unit after the first unit, only in response to energization of the previous unit,
- radio transmitter means, and
- means connected to said decoder means to complete an energizing path for said transmitter means when the last recording means unit is energized,
- said decoder means including a gating circuit associated with each said recording unit, said gating circuits adapted for all but the last recording unit to complete a path for energization of the subsequent recording unit, and for the last recording unit to complete a path for energization of said transmitter means, the gating circuit for each recording unit including a first switch means connected to complete the said energizing path, an actuator for said first switch means, a second switch means set in a conducting mode in response to energization of the associated recording unit, and a third switch means set in a conducting mode a predetermined period of time after energization of the previous recording unit, said actuator and second and third switch means being connected in series circuit.

17. A remote wireless electrical signalling system comprising:

- one or more call stations each including an electromechanical generator, radio transmitter means connected to be energized by said generator, radio receiver means connected to be energized by said generator, manually operable means for operating said generator for a substantial period of time, and switch means connected to direct an output from said generator to said radio transmitter means for an initial portion of the generator operating time for transmission of a call signal, and to said radio receiver means for a subsequent portion of the generator operating time for reception of a confirmation signal, and a home station including radio receiver means for reception of a call signal, and radio transmitter means automatically operable in response to the reception of a call signal for transmission of a confirmation signal.

* * * * *